Patented Oct. 23, 1945

2,387,591

UNITED STATES PATENT OFFICE 2,387,591

QUINOLINE SALTS AS INSECTICIDES

Emile Kolb, La Plaine Saint-Denis, France; vested in the Alien Property Custodian No Drawing. Application March 10, 1942, Serial No. 434,148. In France April 12, 1941

9 Claims. (Cl. 167—33)

For preventing and combating aerial diseases of plants, i. e. those diseases which attack their parts above ground, it has already been proposed to employ ortho-hydroxy-quinoline in the form of quinolinium salts, particularly neutral quinolinium sulphate; to this end, said salts were deposited on the aerial parts by means of spraying, spreading or sprinkling, in form of solutions containing suitable wetting agents.

However, it has not been possible up to this time to secure the results reckoned upon in spite of the valuable properties of quinoline salts; as a matter of fact, owing to their being readily soluble in water, the salts are rapidly carried away, either when they are applied or by rains (thus even if they would be deposited by dusting), and have not a sufficiently protracted contact with the plants to be protected.

It has been endeavoured to insolubilise hydroxy-quinoline by blocking its phenol group; the metal quinolinates thus proposed (copper, iron, nickel and like quinolinates) did not lead to satisfactory results owing to their being much too insoluble in water.

Therefore, in commercial practice, ortho-hydroxy-quinoline and the salts thereof (quinolinium salts and quinolinates) have been chiefly employed for treatment of seeds, transplanted plants or portions thereof ( for instance cuttings) and for internal treatment of trees. It has not been possible to secure satisfactory results in fighting diseases such as mildew, vine oidium and fruit-tree speckles.

It is a primary object of my invention to provide a method enabling of efficiently preventing or combating cryptogamic invasions or diseases of plants, by taking advantage in a novel manner of the known action of hydroxy-quinoline derivatives and salts thereof by causing the active substance to be set free gradually and continuously, said substance being deposited on the part to be treated in the form of a water-insoluble or sparingly soluble product.

It is known that hydroxy-quinolines, their homologues and derivatives having a free hydroxy group yield water-insoluble basic salts with alkaline earth bases. I have found that said salts are slowly decomposed by carbon dioxide and water vapour present in atmosphere with progressive disengagement of hydroxy-quinoline or like active substance.

Consequently, according to my invention, the method for protecting or treating plant parts or elements substantially comprises contacting the same with an alkaline-earth salt of a hydroxy-quinoline, a homologue or a derivative thereof the hydroxy group of which is capable of combining with the alkaline-earth metal (i. e. Ca, Sr, Ba, Mg, Zn). It should be understood that the term "alkaline-earth salt" refers both to neutral salts such, for instance, as $NC_9H_6$—O—Ca—O—$C_9H_6N$ and to basic salts such for instance as $NC_9$—$H_6$—O—Ca—OH.

In actual practice, I generally prefer 8-hydroxy-quinoline from the commercial standpoint; however, 3-, 5-, 6-hydroxy-quinolines are equally useful; among homologues and derivatives suitable for producing useful alkaline earth salts, I may mention, merely by way of examples, 5-methyl-6-hydroxy-quinoline, 5-methyl-8-hydroxy-quinoline, 8-methyl-2-hydroxy-quinoline, 6-isopropyl-8-hydroxy-quinoline, and 6-methyl-8-hydroxy-quinoline sulphate, it being understood that the foregoing list should not be construed in a limitative sense; generally speaking, any soluble salt of hydroxyquinoline capable of yielding the desired alkaline-earth salt through partial or complete double decomposition, for instance mineral acid salts such as sulphuric acid or hydrochloric acid salt, organic acid salts such as citric acid, benzene sulphonic acid, salicylic acid and like salts may be employed for producing useful alkaline earth salts.

For carrying out my method into practice, that is for contacting the alkaline-earth salts with the parts to be protected or treated it is possible to use the salts themselves or reagents capable of producing the same in situ; the salts may be produced before use or they may be formed at the time of use. In applying the salts or parent reagents on the plant parts, it is advisable to adjoint thereto auxiliary substances such as diluting, adhesive, wetting, filling and like agents and even insecticides, other anticryptogamic agents and so on. It will be obvious that either for producing the salts before or during application on plants or for forming them on the plants from parent reagents, the alkaline-earth base may be brought in admixture with the auxiliary substances, either as an impurity thereof, or as an auxiliary substance.

The salts or the parent reagents, admixed or not with auxiliary substances, can be applied by usual procedure such as spraying, sprinkling, coating, brushing, spreading, dusting and so on. The process is suitable for treating standing plants (aerial and underground parts), plants or plant parts which are transplanted or shall be set, transplanted, grafted, etc., as well as for treating seeds; for the sake of simplicity, I shall refer in the claims solely to "treating plant parts" but the words are to be construed as including any and all of the above set forth possibilities.

The alkaline-earth salts as herein proposed have been found particularly efficient against all diseases of plants, both those which, like fruit-speckles, vine oidium, mildew attack aerial parts and those which like rot attack underground parts.

The following examples which have no limiting character will show how my invention can be carried in practice.

Example 1

94 kg. of magnesium chloride (100 per cent) were dissolved in 500 litres of water and an alkaline base (sodium hydroxide, potassium hydroxide, ammonia) was added to set free magnesium hydroxide, then 145 kg. of hydroxyquinoline base were added and the whole was stirred at 60–70° C. until the reaction was completed. The reaction may be effected with non-equimolecular amounts of reagents.

The mixture was then filtered, washed and dried. The product thus obtained was finely powdered. It may be applied by dusting or made into a paste with water and sprayed on plants to be treated.

Example 2

350 g. of the product obtained in accordance with Example 1 where admixed with 100 litres of a thin adhesive and wetting paste of cryolite or another insecticide or anti-cryptogamic product, and the mixture was used just as it was.

Example 3

2.08 kg. of 6-methyl-8-hydroxyquinoline neutral sulphate were dry mixed with 1 kg. of slaked lime, then 70 kg. of kaolin, wetting agents and adhesive agents were added thereto.

Example 4

2.600 kg. of 8-ethyl-3-hydroxy-quinoline hydrochloride, 30 kg. of lead, aluminum or calcium arsenate, 4 kg. of calcium hydroxide, barium hydroxide, strontium hydroxide, magnesium hydroxide or $Zn(OH)_2$, 4 kg. of sodium α-butyl-naphthalene-β-sulphonate, 3 kg. of casein and 76 kg. of kaolin were dry mixed. The mixture was used either in dry form or in moist form. It may be stored in dry form or as a paste which may be dried.

Example 5

4 kg. of lime, 4 kg. of cellulose ligno-sulphite, 3 kg. of casein and 86 kg. of cryolite were admixed according to a dry or moist process; the mixture was treated with a solution of 2 kg. of 8-hydroxy-quinoline in an organic solvent such as alcohol. The mixture may be dried for recovering the solvent or used as such after suitable dilution.

It will be obvious that many changes may be brought in the above method without departing from the spirit of my invention; thus for example, when producing the alkaline-earth salts or when determining the amounts of reagents for generating said salts in situ, it is possible, when desired, to convert hydroxy-quinoline or related substances only partially into alkaline-earth salts.

It will further be understood that my invention comprises the novel compositions of matter constituted by anti-cryptogamic or like preparations including among their components either alkaline-earth salts of hydroxy-quinoline, homologues or derivatives of hydroxy-quinolines, or parent reagents for said salts.

What I claim is:

1. A composition for treating plant parts which includes a wetting agent, an adhesive agent and a composition containing an alkaline earth base and an acid salt of quinoline wherein oxygen is attached to a carbon atom of the quinoline nucleus.

2. The process of treating plant parts, which comprises depositing thereon a calcium salt of 8-hydroxy-quinoline.

3. The process of treating plant parts, which comprises depositing thereon lime and an acid salt of 8-hydroxy-quinoline.

4. The process of treating plant parts, which comprises depositing thereon a wetting agent, an adhesive agent and a composition including an alkaline earth base and an acid salt of quinoline wherein oxygen is attached to a carbon atom of the nucleus.

5. The process of treating plant parts, which comprises depositing thereon a compound having a radicle of the formula

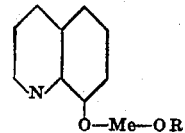

wherein Me stands for an alkaline-earth metal and R stands for hydrogen or a quinoline residue.

6. The process of treating plant parts, which comprises depositing thereon a compound having a radicle of the formula

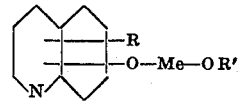

wherein Me stands for an alkaline-earth metal and R stands for hydrogen or a lower aliphatic radicle and R' stands for hydrogen or a quinoline residue.

7. The process of treating plant parts, which comprises depositing thereon a compound having a quinoline-nucleus to a carbon atom of which is attached the oxygen atom of a RO—Me—O group, Me being an alkaline-earth metal and R stands for hydrogen or a quinoline residue.

8. The process of treating plant parts, which comprises depositing thereon an alkaline-earth base and a hydroxy-quinoline in form of its combination with an acid.

9. The process of treating plant parts, which comprises depositing thereon an alkaline-earth base and a hydroxy-quinoline.

EMILE KOLB.